United States Patent
Ohata et al.

(10) Patent No.: US 12,552,990 B2
(45) Date of Patent: Feb. 17, 2026

(54) POROUS BODY AND METHOD FOR MANUFACTURING POROUS BODY

(71) Applicant: Murata Manufacturing Co., Ltd., Nagaokakyo (JP)

(72) Inventors: Hiroyuki Ohata, Nagaokakyo (JP); Hiroyuki Masaki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 18/442,411

(22) Filed: Feb. 15, 2024

(65) Prior Publication Data

US 2024/0182784 A1 Jun. 6, 2024

Related U.S. Application Data

(63) Continuation of application No. PCT/JP2022/039917, filed on Oct. 26, 2022.

(30) Foreign Application Priority Data

Oct. 29, 2021 (JP) ................. 2021-177937

(51) Int. Cl.
*G02F 1/1333* (2006.01)
*C09K 19/02* (2006.01)
*C09K 19/38* (2006.01)

(52) U.S. Cl.
CPC .......... *C09K 19/02* (2013.01); *C09K 19/3838* (2013.01); *C09K 2219/01* (2013.01)

(58) Field of Classification Search
CPC ........ C09K 19/02; C09K 19/04; C09K 19/38; C09K 19/3838; C09K 2219/01
See application file for complete search history.

(56) References Cited

U.S. PATENT DOCUMENTS 5,545,475 A * 8/1996 Korleski ............ C08J 5/18
428/317.9
6,229,096 B1 5/2001 Gaku et al.
2015/0257263 A1 9/2015 Sethumadhavan et al.
2021/0310166 A1 10/2021 Nakayama et al.
2022/0136149 A1 5/2022 Nakayama et al.
2022/0204848 A1 6/2022 Ohata
2023/0002548 A1 1/2023 Ohata et al.
2024/0182784 A1* 6/2024 Ohata .............. C09K 19/02
2025/0092605 A1* 3/2025 Makino ............. C08J 3/03

FOREIGN PATENT DOCUMENTS

| JP | H10325065 A | 12/1998 | |
|---|---|---|---|
| JP | H11255908 A | 9/1999 | |
| JP | 2000119952 A | 4/2000 | |
| JP | 2002061063 A | 2/2002 | |
| JP | 2002064254 A | 2/2002 | |
| JP | 2002266281 A | 9/2002 | |
| JP | 2003026866 A | 1/2003 | |
| JP | 2003129392 A | 5/2003 | |
| JP | 2005120535 A | 5/2005 | |
| JP | 2006061789 A | 3/2006 | |
| JP | 2009197147 A * | 9/2009 | ............ C08J 9/26 |
| JP | 2012224692 A | 11/2012 | |
| JP | 2017514315 A | 6/2017 | |
| WO | 2020137605 A1 | 7/2020 | |
| WO | 2021010178 A1 | 1/2021 | |
| WO | 2021060255 A1 | 4/2021 | |
| WO | 2021177402 A1 | 9/2021 | |

OTHER PUBLICATIONS

Machine Translation of JP 2009-197147 A (Year: 2025).*
International Search Report in PCT/JP2022/039917, mailed Jan. 24, 2023, 4 pages.

* cited by examiner

*Primary Examiner* — Geraldina Visconti
(74) *Attorney, Agent, or Firm* — ArentFox Schiff LLP

(57) ABSTRACT

A porous body containing a liquid crystal polymer powder that has liquid crystal polymer fibers, wherein an average size of the liquid crystal polymer fibers is 2 μm or less, the porous body has an average pore size of 10 μm or less as measured by mercury intrusion porosimetry, and the porous body has a tensile strength of 25 N/mm² or more.

7 Claims, 5 Drawing Sheets

POROUS BODY AND METHOD FOR MANUFACTURING POROUS BODY

CROSS REFERENCE TO RELATED APPLICATIONS

The present application is a continuation of International application No. PCT/JP2022/039917, filed Oct. 26, 2022, which claims priority to Japanese Patent Application No. 2021-177937, filed Oct. 29, 2021, the entire contents of each of which are incorporated herein by reference.

TECHNICAL FIELD

The present invention relates to a porous body and a method for manufacturing a porous body.

BACKGROUND ART

In general, porous bodies of polymer include nonwoven fabrics based on fibers and porous films based on film manufacturing methods (Patent Documents 1 to 7). In a case where a porous body of polymer is formed using a liquid crystal polymer (LCP), only a porous body having a coarse fiber diameter and large pores is obtained when a nonwoven fabric is formed using fibers obtained by a general melt spinning method, and it is necessary to use an LCP of fine fibers in order to obtain a porous body having fine pores. Examples of methods for forming a nonwoven fabric using an LCP of fine fibers include a paper making method and a melt blowing method. Examples of methods for forming a porous film include a method in which an LCP film containing a filler is drawn and a phase separation method.

Patent Document 1: Japanese Patent Application Laid-Open No. 2003-129392
Patent Document 2: Japanese Patent Application Laid-Open No. 2000-119952
Patent Document 3: Japanese Patent Application Laid-Open No. 2003-26866
Patent Document 4: Japanese Patent Application Laid-Open No. 2005-120535
Patent Document 5: Japanese Patent Application Laid-Open No. 2002-61063
Patent Document 6: Japanese Patent Application Laid-Open No. 2017-514315
Patent Document 7: Japanese Patent Application Laid-Open No. 2012-224692

SUMMARY OF THE INVENTION

However, in a case where a nonwoven fabric is formed using a papermaking method, there are problems such as the inability to use the fabric at high temperatures, the porous body being crushed, and the strength being weak. In a case where a nonwoven fabric is formed using a melt blowing method, the melt viscosity is highly temperature dependent and the fluidity changes as the temperature is slightly raised or lowered, and there are problems such as the need to form the fabric in a narrow temperature range.

In a case where a porous film is formed by a method in which an LCP film containing a filler is drawn, only a film having small through holes is formed but a dense porous body is not formed. In a case where a porous film is formed using a phase separation method, only an LCP that is soluble in a solvent can be used.

In view of the problems, an object of the present disclosure is to provide a porous body having a high strength by using an LCP of fine fibers.

A porous body of the present disclosure comprises: a liquid crystal polymer powder that contains liquid crystal polymer fibers, wherein an average size of the liquid crystal polymer fibers is 2 μm or less, the porous body has an average pore size of 10 μm or less as measured by mercury intrusion porosimetry, and the porous body has a tensile strength of 25 N/mm$^2$ or more.

According to the present disclosure, it is possible to provide a porous body having a high strength by using an LCP of fine fibers.

DETAILED DESCRIPTION OF THE INVENTION

Figure 1:
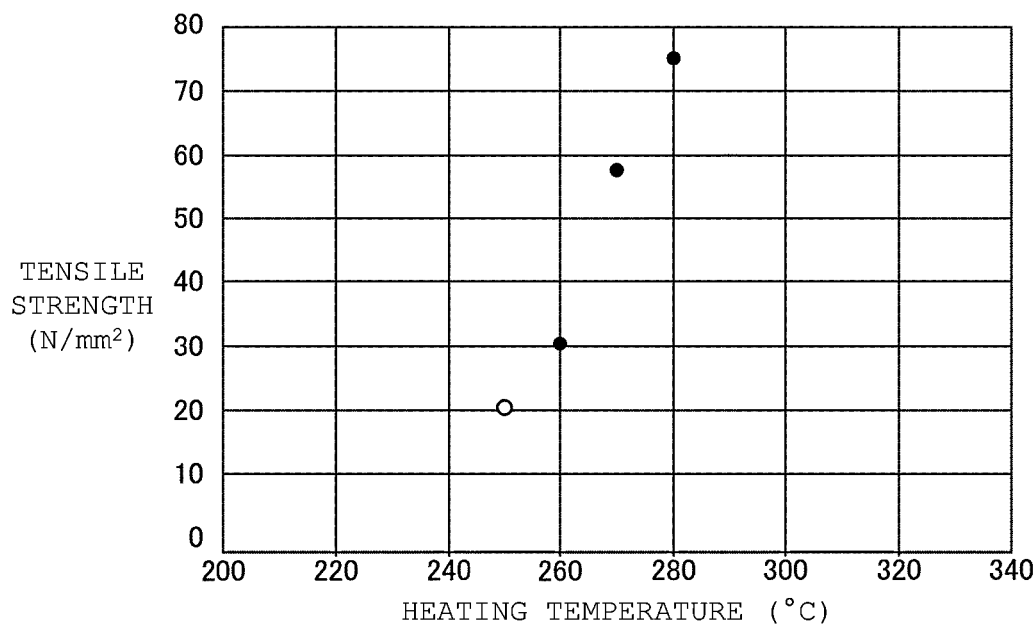
FIG. 1 is a graph illustrating relation between a heating temperature in a heating step and a tensile strength for Examples 1 to 3 and Comparative Example 1.

Hereinafter, embodiments of the present disclosure will be described, but the present disclosure is not limited thereto.

First Embodiment

<Porous Body>

The porous body according to the present embodiment contains a liquid crystal polymer powder (LCP powder), the liquid crystal polymer powder contains fibrous particles formed of a liquid crystal polymer (liquid crystal polymer fibers: LCP fibers), and the average diameter of the LCP fibers is 2 μm or less. The porous body has an average pore size of 10 μm or less as measured by mercury intrusion porosimetry, and a tensile strength of 25 N/mm$^2$ or more.

(Liquid Crystal Polymer Powder)

The liquid crystal polymer is not particularly limited, and examples thereof include a thermotropic liquid crystal polymer. The thermotropic liquid crystal polymer is, for example, an aromatic polyester synthesized mainly containing a monomer such as an aromatic diol, an aromatic dicarboxylic acid, or an aromatic hydroxycarboxylic acid, and exhibits liquid crystallinity during melting.

A molecule of the liquid crystal polymer has a negative linear expansion coefficient (CTE) in an axial direction of a molecular axis and a positive CTE in a radial direction of the molecular axis.

The liquid crystal polymer preferably has no amide bond. Examples of the thermotropic liquid crystal polymer having no amide bond include a copolymer of parahydroxybenzoic acid, terephthalic acid, and dihydroxybiphenyl (a block copolymer of parahydroxybenzoic acid and ethylene terephthalate) having a high melting point and a low CTE, which is called a type-1 liquid crystal polymer, and a copolymer of parahydroxybenzoic acid and 2,6-hydroxynaphthoic acid (a block copolymer) having a melting point between a type-1 liquid crystal polymer and a type-2 liquid crystal polymer, which is called type-1.5 (or type-3).

The LCP fibers contained in the LCP powder are not particularly limited as long as they contain a fibrous portion. The fibrous portion may be linear or may have branching or the like.

The average diameter of the LCP fibers is 2 μm or less, preferably 1 μm or less. Moreover, the average aspect ratio of the LCP fibers is preferably 10 to 500, and more preferably 10 to 300.

Note that, the average diameter and average aspect ratio of the LCP fibers are measured by the following method.

The LCP powder composed of the LCP fibers to be measured is dispersed in ethanol to prepare a slurry in which 0.01% by mass of the LCP powder is dispersed. At this time, the slurry was prepared so that a moisture content in the slurry was 1% by mass or less. Then, 5 μL to 10 μL of this slurry was dropped onto a slide glass, and then the slurry on the slide glass was naturally dried. The LCP powder is disposed on the slide glass by naturally drying the slurry.

Next, a predetermined region of the LCP powder disposed on the slide glass is observed with a scanning electron microscope (SEM) to collect 100 or more pieces of image data of the particles (the LCP fibers) constituting the LCP powder. Note that, in the collection of the image data, the region was set according to the size per particle of the LCP so that the number of image data was 100 or more. Moreover, for each particle of the LCP, the image data was collected by appropriately changing a magnification of the SEM to 500 times, 3,000 times, or 10,000 times in order to suppress leakage of the collection of the image data and occurrence of a measurement error.

Next, a longitudinal direction dimension and a width direction dimension of each of the LCP fibers are measured using the collected image data.

In one of the LCP fibers photographed in each piece of the image data, a direction of a straight line connecting both ends of a longest path in a path from one end portion to an end portion opposite to the one end portion through substantially a center of the particle is defined as a longitudinal direction. Then, a length of a straight line connecting both ends of the longest path is measured as the longitudinal direction dimension.

Moreover, a particle dimension of one particle of the LCP powder in a direction orthogonal to the longitudinal direction was measured at three different points in the longitudinal direction. An average value of the dimensions measured at these three points was taken as the width direction dimension (fiber diameter) per particle of the LCP powder.

Furthermore, a ratio of the longitudinal direction dimension to the fiber diameter [longitudinal dimension/fiber diameter] is calculated and taken as the aspect ratio of the LCP fibers.

Then, the average value of the fiber diameters measured for 100 LCP fibers is taken as the average diameter.

Moreover, the average value of the aspect ratios measured for 100 LCP fibers is taken as the average aspect ratio.

Note that, the fibrous particles may be contained in the LCP powder as an aggregate in which the fibrous particles are aggregated.

Moreover, in the fibrous particles, the axial direction of the LCP molecules constituting the fibrous particles and the longitudinal direction of the fibrous particles tend to coincide with each other. Note that, it is considered that this is because, in a case where the LCP powder is produced, the axial direction of the LCP molecules is oriented along the longitudinal direction of the fibrous particles due to breakage between a plurality of domains formed by bundling the LCP molecules.

In the LCP powder, a content (a number ratio) of particles other than the fibrous particles (massive particles that are not substantially fibrous) is preferably 20% or less. For example, when the LCP powder is placed on a plane, particles having a maximum height of 10 μm or less are fibrous particles, and particles having a maximum height of more than 10 μm are massive particles.

The LCP powder preferably has a D50 (an average particle size) value of 13 μm or less as measured by particle size measurement using a particle size distribution measuring device by a laser diffraction scattering method.

(Average Pore Size)

The porous body of the present embodiment has an average pore size of 10 μm or less. Here, the "average pore size" refers to the pore size at which the cumulative pore distribution of the pore distribution measured by mercury intrusion porosimetry is 50% of the total pore volume. In a case where the average pore size of the porous body exceeds 10 μm, the functions of the porous body such as filtering performance may not be sufficiently obtained. The average pore size of the porous body is preferably 5.0 μm or less. The average pore size of the porous body may be 0.1 μm or more, or 0.3 μm or more.

(Tensile Strength)

The porous body of the present embodiment has a tensile strength of 25 N/mm$^2$ or more. The tensile strength in the present embodiment is the value (N/mm$^2$) obtained by dividing the load value at which the test piece is cut when a 5 mm×25 mm test piece taken from the porous body is stretched at a length of test piece between grips of 13 mm and a tensile speed of 0.6 mm/min by the sectional area excluding the pore portion. By defining the tensile strength in this way, the tensile strength is not affected by the film thickness, and it is possible to compare the tensile strengths themselves of porous bodies having different film thicknesses. The tensile strength of the porous body is preferably 40 N/mm$^2$ or more, more preferably 60 N/mm$^2$ or more.

(Additives)

The porous body of the present embodiment may contain additives. By containing additives in the porous body, the functions possessed by the additives, for example, functions such as water repellency, oil repellency, and heat dissipating properties, can be imparted to the porous body. Examples of the additives include inorganic fillers, polytetrafluoroethylene (PTFE), perfluoroalkoxyalkanes (PFA), fine carbon powders, fine carbon fibers, metal powders, and nitride powders. Examples of the nitride powders include a boron nitride powder, an aluminum nitride powder, and a silicon nitride powder.

The porous body of the present embodiment does not contain an adhesive for bonding LCP fibers together. This is because the porous body of the present embodiment achieves the above-mentioned tensile strength through bonding of LCP fibers to each other by heating. This is also because containing an adhesive may cause problems such as a decrease in heat resistance and an increase in water absorbing properties.

<Method for Manufacturing Porous Body>

Hereinafter, each step of the manufacturing method of the present embodiment will be described.

Figure 9:
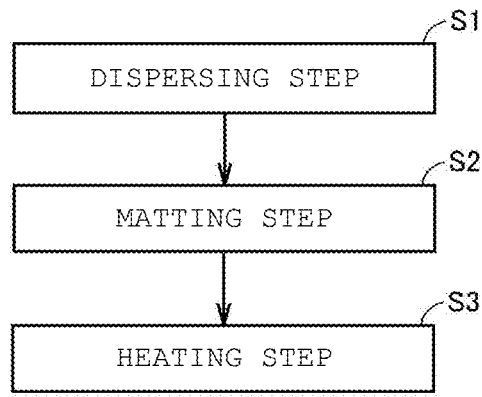
FIG. 9 is a flow chart illustrating a manufacturing process of a porous body of a first embodiment.

As illustrated in FIG. 9, the method for manufacturing a porous body according to the present embodiment includes a dispersing step (S1), a matting step (S2), and a heating step (S3).

First, the method for fabricating the LCP powder used in the dispersing step (S1) will be described in detail. The LCP powder can be fabricated, for example, by performing the following coarse pulverizing step, fine pulverizing step, coarse particle removing step, and fiberizing step in this order.

Examples of the shape of an LCP-containing raw material (an LCP raw material) used for fabricating the LCP powder include uniaxially oriented pellets, biaxially oriented films, and powdery LCP. The LCP constituting the LCP raw material is similar to the LCP constituting the LCP fibers described above.

(Coarse Pulverizing Step)

In the coarse pulverizing step, the LCP raw material is coarsely pulverized. For example, the LCP raw material is coarsely pulverized with a cutter mill. A size of the particles of the coarsely pulverized LCP is not particularly limited as long as the particles can be used as a raw material in the fine pulverizing step described later. A maximum particle size of the coarsely pulverized LCP is, for example, 3 mm or less.

Note that, the coarse pulverizing step is not necessarily performed. For example, if the LCP raw material can be used as a raw material in the fine pulverizing step, the LCP raw material may be directly used as a raw material in the fine pulverizing step.

(Fine Pulverizing Step)

In the fine pulverizing step, the LCP raw material (after the coarse pulverizing step) is pulverized in a state of being dispersed in liquid nitrogen to obtain a granular finely pulverized liquid crystal polymer (finely pulverized LCP).

In the fine pulverizing step, it is preferable that the LCP raw material which is dispersed in the liquid nitrogen is pulverized using a medium. The medium is, for example, a bead. In the fine pulverizing step of the present embodiment, it is preferable to use a bead mill having relatively few technical problems from a viewpoint of handling liquid nitrogen. Examples of the apparatus that can be used in the fine pulverizing step include "LNM-08" which is a liquid nitrogen bead mill manufactured by AIMEX CO., LTD.

The granular finely pulverized LCP obtained by the fine pulverizing step preferably has a D50 of 50 μm or less as measured by a particle size distribution measuring device by a laser diffraction scattering method. As a result, this makes it possible to suppress clogging of the granular finely pulverized LCP with a nozzle in the following fiberizing step.

(Coarse Particle Removing Step)

Next, in the coarse particle removing step, coarse particles are removed from the granular finely pulverized LCP obtained in the fine pulverizing step. For example, the granular finely pulverized LCP is sieved with a mesh to obtain the granular finely pulverized LCP under the sieve, and the coarse particles contained in the granular finely pulverized LCP can be removed by removing the granular LCP on the sieve. A type of mesh may be appropriately selected, and examples of the mesh include a mesh having an opening of 53 μm. Note that, the coarse particle removing step is not necessarily performed.

(Fiberizing Step)

Next, in the fiberizing step, the granular LCP is crushed by a wet high-pressure crushing device to obtain LCP powder. In the fiberizing step, first, the finely pulverized LCP is dispersed in a dispersion medium for the fiberizing step. In the finely pulverized LCP to be dispersed, the coarse particles may not be removed, but it is preferable that the coarse particles are removed. Examples of the dispersion medium for the fiberizing step include water, ethanol, methanol, isopropyl alcohol, toluene, benzene, xylene, phenol, acetone, methyl ethyl ketone, diethyl ether, dimethyl ether, hexane, and mixtures thereof.

Then, the finely pulverized LCP in a state of being dispersed in the dispersion medium for the fiberizing step, that is, the paste-like or the slurry-like finely pulverized LCP is passed through the nozzle in a state of being pressurized at high pressure. By passing through the nozzle at a high pressure, a shearing force or collision energy due to a high-speed flow in the nozzle acts on the LCP, and the granular finely pulverized LCP is crushed, so that the fiberization of the LCP proceeds and LCP powder consisting of fine LCP fibers can be obtained. A nozzle diameter of the nozzle is preferably as small as possible within a range in which clogging of the finely pulverized LCP does not occur in the nozzle from a viewpoint of applying high shear force or high collision energy. Since the granular finely pulverized LCP has a relatively small particle size, the nozzle diameter in the wet high-pressure crushing device used in the fiberizing step can be reduced. The nozzle diameter is, for example, 0.2 mm or less.

Note that, as described above, a plurality of fine cracks is formed in the granular finely pulverized LCP. Therefore, the dispersion medium enters into the finely pulverized LCP through fine cracks by pressurization in a wet high-pressure crushing device. Then, when the paste-like or the slurry-like finely pulverized LCP passes through the nozzle and is positioned under normal pressure, the dispersion medium that has entered the finely pulverized LCP expands in a short time. When the dispersion medium that has entered the finely pulverized LCP expands, destruction progresses from inside of the finely pulverized LCP. Therefore, the fiberization proceeds to the inside of the finely pulverized LCP, and the molecules of the LCP are separated into domain units arranged in one direction. As described above, in the fiberizing step in the present embodiment, by defiberizing the granular finely pulverized LCP obtained in the fine pulverizing step in the present embodiment, it is possible to obtain the LCP powder which has a low content of massive particles and consists of fine LCP fibers as compared with the LCP powder obtained by crushing the granular LCP obtained by a conventional freeze pulverizing method.

Note that, in the fiberizing step in the present embodiment, the finely pulverized LCP may be crushed by the wet high-pressure crushing device a plurality of times to obtain the LCP powder, but from a viewpoint of production efficiency, the number of times of crushing by the wet high-pressure crushing device is preferably small, and is, for example, 5 times or less.

(Dispersing Step: S1)

In the dispersing step, which is the first step in the method for manufacturing a porous body, the above-described LCP powder is dispersed in a dispersion medium to form a paste or a slurry. As described above, in the present embodiment, since the LCP powder in a fine fiber form described above is used, the LCP powder can be dispersed in a highly viscous dispersion medium.

Examples of the dispersion medium used in the dispersing step include butanediol, water, ethanol, terpineol, and a mixture of water and ethanol. For example, in a case where butanediol is used as the dispersion medium, a paste-like LCP powder is obtained. In a case where a mixture of water and ethanol is used as the dispersion medium, a slurry-like LCP powder is obtained.

In a case where a porous body containing additives is manufactured, the LCP powder and the additives are mixed in this step to obtain a paste-like or slurry-like mixture of the LCP powder and the additives (hereinafter, the mixture of an LCP powder and additives is simply referred to as "mixture" in some cases). The mixing proportion of the additives is preferably set to 50% by volume or less with respect to the mixture.

(Matting Step: S2)

Next, in the matting step, a paste-like or slurry-like LCP powder or mixture is dried to form a liquid crystal polymer fiber mat (an LCP fiber mat). In the present embodiment, the matting step is, for example, a papermaking method. In the papermaking method, the dispersion medium used in the dispersing step can be easily recovered and reused, and porous bodies can be manufactured at low cost.

In the matting step using the papermaking method, specifically, first, a slurry-like LCP powder or mixture is subjected to papermaking on a mesh, a nonwoven fabric-like microporous sheet, or a woven fabric. Then, the slurry-like LCP powder or mixture disposed on the mesh is heated and dried to obtain an LCP fiber mat.

In the matting step in the present embodiment, a paste-like LCP powder or mixture may be formed into an LCP fiber mat by an applying step and a drying step instead of the papermaking method.

In the applying step, a paste-like LCP powder or mixture is applied to a substrate. Here, "substrate" refers to the material or support material for applying the paste-like LCP powder or mixture, and examples thereof include metal foils such as a copper foil, a polyimide film, a PTFE film, or composite sheets formed of reinforcing materials such as carbon fibers and glass fibers and heat resistant resins.

Next, in the drying step, the paste-like LCP powder or mixture applied to the substrate is heated and dried to vaporize the dispersion medium. By the heating and drying, the LCP fiber mat is formed on the substrate.

In the drying step, since the dispersion medium is gradually removed from the paste-like LCP powder or mixture, the total thickness of the paste-like LCP powder or mixture gradually decreases during drying. Therefore, the thickness of the LCP fiber mat is thinner compared to the total thickness of the paste-like LCP powder or mixture formed on the product.

Furthermore, as the total thickness of the paste-like LCP powder or mixture gradually decreases during drying, the longitudinal direction of the fibrous particles in the LCP powder changes. Specifically, among the fibrous particles, the fibrous particles having the longitudinal direction in the entire thickness direction of the paste-like LCP powder or mixture are inclined such that the longitudinal direction is directed toward the inside of the main surface of the substrate. Therefore, there is anisotropy in the longitudinal direction of the fibrous particles in the formed LCP fiber mat.

In the matting step, the dispersion medium may be vaporized by further applying a paste-like LCP powder or mixture onto the LCP fiber mat formed on the substrate in the drying step, and then drying this. As described above, the matting step may include the applying step and the drying step repeatedly in this order. As a result, an LCP fiber mat having a desired basis weight can be obtained. In a case where the applying step and the drying step are repeatedly performed, a mixture in which the mixing ratio of the LCP powder to the additives is changed for each applying step may be used. An LCP fiber mat capable of forming a porous body having desired properties can be thus obtained.

(Heating Step: S3)

Next, in the heating step, the LCP fiber mat is heated to obtain a porous body. In the heating step, heating may be performed in an inert gas atmosphere. By doing so, the tensile strength of the porous body can be further improved.

The heating temperature in the heating step is in a range in which the heating temperature is lower than the melting point of the LCP powder by 60° C. to 5° C. In a case where the heating temperature is lower than the melting point of the LCP powder by more than 60° C., bonding between LCP fibers is weak and a porous body having a strength for practical use cannot be obtained. In a case where the heating temperature is lower than the melting point of the LCP powder by less than 5° C., the LCP fibers are softened and deformed and the porous structure cannot be maintained. The heating temperature is preferably in a range in which the heating temperature is lower than the melting point of the LCP powder by 50° C. to 10° C., more preferably in a range in which the heating temperature is lower than the melting point of the LCP powder by 40° C. to 20° C.

The holding time in the heating step is not particularly limited, and may be, for example, 5 minutes or more, or 15 minutes or more. Since a porous body having a higher strength can be obtained by increasing the holding time, the holding time may be, for example, 30 minutes or more, or 60 minutes or more.

In the matting step, in a case where an LCP fiber mat is formed on the substrate by the applying step and drying step, the LCP fiber mat is heated together with the substrate. As a result, a porous body in a state of being joined to a substrate can be obtained at low cost. By applying a paste-like LCP powder or mixture to the required portion of the substrate and performing drying, it is also possible to form a porous body on a part of the substrate or to three-dimensionally form a porous body on the substrate.

Second Embodiment

<Porous Body>

The porous body of the present embodiment differs from that of the first embodiment in that the porous body has an average pore size of 1.0 µm or less. Porous bodies having fine average pore sizes are considered to be excellent in strength, filtering properties, and the like. Points other than this are the same as those in the first embodiment, and redundant explanation will be omitted.

<Method for Manufacturing Porous Body>

Figure 10:
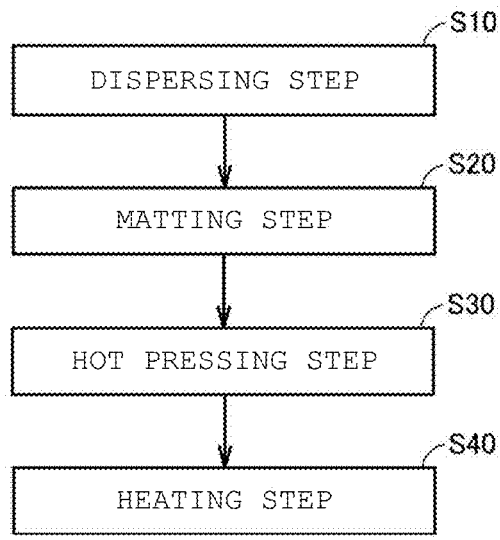
FIG. 10 is a flow chart illustrating a manufacturing process of a porous body of a second embodiment.

As illustrated in FIG. 10, the method for manufacturing a porous body according to the present embodiment includes a dispersing step (S10), a matting step (S20), a hot pressing step (S30), and a heating step (S40). Hereinafter, each step of the manufacturing method of the present embodiment will be described. Descriptions that overlap with those of the first embodiment will be omitted.

(Dispersing Step: S10)

In the dispersing step, an LCP powder and a binder resin are dispersed in a dispersion medium to prepare a paste-like or slurry-like resin mixture. By mixing a binder resin in the dispersing step and forming a film in the hot pressing step to be described below, improvement in handling properties is expected so that processing before porous body fabrication can be easily performed.

Examples of the binder resin used in the dispersing step include acrylic resins, butyral resins, and ethyl cellulose resins. Among these, acrylic resins are preferable from the viewpoint of degradability. The mixing proportion of the binder resin is preferably set to 30% by volume to 70% by volume with respect to the resin mixture. The average diameter of the binder resin is preferably 10 μm or less.

In a case where a porous body containing additives is manufactured, an LCP powder, a binder resin, and additives are mixed in this step.

(Matting Step: S20)

Next, in the matting step, a paste-like or slurry-like resin mixture or a resin mixture containing additives is dried to form a resin mixture mat.

(Hot Pressing Step: S30)

Next, in the hot pressing step, the resin mixture mat is hot pressed to obtain a resin mixture film.

The heating temperature in the hot pressing step is 20° C. to 100° C. In a case where the heating temperature is less than 20° C., the binder resin is not softened and it is difficult to form a film. In a case where the heating temperature exceeds 100° C., the binder resin flows. The heating temperature is preferably 40° C. to 80° C.

The pressure in the hot pressing step is 0.3 MPa to 3.0 MPa. In a case where the pressure is less than 0.3 MPa, the pressure is insufficient and bubbles remain. In a case where the pressure exceeds 3.0 MPa, the binder resin flows. The pressure is preferably 0.5 MPa to 1.0 MPa.

The holding time in the hot pressing step is not particularly limited, and may be, for example, 1 minute or more, or 10 minutes or more.

(Heating Step: S40)

Next, in the heating step, at least a portion of the binder resin contained in the resin mixture film is removed by heating to obtain a porous body. The porous body may contain a binder resin. The proportion of the remaining binder resin is adjusted by the heating temperature and holding time in the heating step.

EXAMPLES

Hereinafter, the present disclosure will be described in more detail with reference to Examples, but the present disclosure is not limited thereto.

Test 1

Example 1

(Production of Liquid Crystal Polymer Powder)

In Example 1, first, uniaxially oriented pellets of LCP (cylindrical pellet having a diameter of 3 to 4 mm, melting point: 315° C.) were prepared as an LCP raw material. The material of LCP is a copolymer of parahydroxybenzoic acid and 4, 6-hydroxynaphthoic acid.

This LCP raw material was coarsely pulverized by a cutter mill (MF10, manufactured by IKA). The coarsely pulverized LCP was passed through a mesh having a diameter of 3 mm provided at a discharge port of the cutter mill to obtain a coarsely pulverized LCP.

Next, the coarsely pulverized LCP was finely pulverized with a liquid nitrogen bead mill (LNM-08 manufactured by AIMEX CORPORATION, vessel capacity: 0.8 L). Specifically, 500 mL of media and 30 g of coarsely pulverized LCP were put into a vessel, and pulverization treatment was performed at a rotation speed of 2000 rpm for 120 minutes.

As the medium, beads made of zirconia ($ZrO_2$) having a diameter of 5 mm were used. Note that, in the liquid nitrogen bead mill, wet pulverizing treatment is performed in a state in which the coarsely pulverized LCP is dispersed in the liquid nitrogen. As described above, by pulverizing the coarsely pulverized LCP with the liquid nitrogen bead mill, granular finely pulverized LCP was obtained.

The particle size of the finely pulverized LCP was measured. The finely pulverized LCP dispersed in the dispersion medium was subjected to ultrasonic treatment for 10 seconds, and then set in a particle size distribution measuring device (LA-950 manufactured by HORIBA Ltd.) by a laser diffraction scattering method to measure the particle size. Note that, as the dispersion medium, Ekinen (registered trademark, Japan Alcohol Sales Co., Ltd.) which was a mixed solvent containing ethanol as a main agent was used. A measured value of D50 for the finely pulverized LCP was 23 μm.

Next, a dispersion liquid obtained by dispersing the finely pulverized LCP in Ekinen was sieved with a mesh having an opening of 53 μm to remove the coarse particles contained in the finely pulverized LCP, and finely pulverized LCP passing through the mesh was recovered. A yield of the finely pulverized LCP by the removal of coarse particles was 85% by mass.

Next, the finely pulverized LCP from which the coarse particles were removed was dispersed in a 20% by mass ethanol aqueous solution. An ethanol slurry in which the finely pulverized LCP was dispersed was repeatedly crushed five times using a wet high-pressure crushing device under conditions with a nozzle diameter of 0.2 mm and a pressure of 200 MPa to be formed into fibers. As the wet high-pressure crushing device, a high-pressure crushing device (Nanoveta manufactured by Yoshida Kikai Kogyo Co., Ltd.) was used. The ethanol slurry in which the finely pulverized LCP was dispersed was dried with a spray dryer to obtain the LCP powder. An average fiber diameter measured for 100 LCP fibers contained in the LCP powder was 0.8 μm.

(Manufacture of Porous Body)

The LCP powder obtained above was dispersed in a 50% by mass ethanol aqueous solution as a dispersion medium to form a slurry.

Next, the slurry-like LCP powder was subjected to papermaking on a polyester microfiber nonwoven fabric (basis weight: 14 g/m$^2$) placed on an 80 mesh wire mesh using a square sheet machine (manufactured by KUMAGAI RIKI KOGYO Co., Ltd.) to obtain an LCP fiber mat. The amount of LCP powder was adjusted so that the basis weight of the LCP fiber mat was 35 g/m$^2$. The LCP fiber mat was dried using a hot air dryer and peeled off from the polyester microfiber nonwoven fabric to form an LCP fiber mat.

Next, the LCP fiber mat was placed on a stainless steel vat and heated in a hot air inert oven (Inert Gas Oven INH-21CD, manufactured by JTEKT THERMO SYSTEM CORPORATION). Specifically, a heat treatment was performed at 260° C. for 60 minutes in a nitrogen stream. A porous body was thus obtained.

Examples 2 and 3 and Comparative Example 1

In Examples 2 and 3 and Comparative Example 1, the heating temperatures in the hot air inert oven were set to 270° C., 280° C., and 250° C., respectively. LCP powders were produced and porous bodies were obtained in the same manner as in Example 1 except for this.

Examples 4 to 6 and Comparative Example 2

In Examples 4 to 6 and Comparative Example 2, uniaxially oriented LCP pellets (cylindrical pellets having a diameter of 3 to 4 mm, melting point: 340° C.) were prepared as an LCP raw material. The material of LCP is a copolymer of parahydroxybenzoic acid and 4,6-hydroxynaphthoic acid. The LCP powder was produced in the same manner as in Example 1 except that the LCP raw material was changed as described above. The average fiber diameter measured for 100 LCP fibers contained in the LCP powder was 0.9 µm.

In Examples 4 to 6 and Comparative Example 2, the heating temperatures in the hot air inert oven were set to 280° C., 290° C., 300° C., and 270° C., respectively. Porous bodies were obtained in the same manner as in Example 1 except for this.

Example 7

In Example 7, uniaxially oriented LCP pellets (cylindrical pellets having a diameter of 3 to 4 mm, melting point: 430° C.) were prepared as an LCP raw material. The material of LCP is a copolymer of parahydroxybenzoic acid, terephthalic acid, and dihydroxyphenyl. The LCP powder was produced in the same manner as in Example 1 except that the LCP raw material was changed as described above. The average fiber diameter measured for 100 LCP fibers contained in the LCP powder was 1.1 µm.

The LCP powder obtained above and an acrylic resin powder (average particle size: 2 µm) as a resin binder were weighed so that the volume ratio was 1:1, and dispersed in a 50% by mass ethanol aqueous solution as a dispersion medium to form a slurry. Next, the slurry-like resin mixture was treated in the same manner as in Example 1 to form a resin mixture mat.

The resin mixture mat obtained above was hot pressed at 60° C. and 0.6 MPa to fabricate a resin mixture film. The resin mixture film was then placed on a stainless steel vat and heated in the same hot air inert oven as in Example 1. Specifically, a heat treatment was performed at 380° C. for 60 minutes in a nitrogen stream. A porous body of Example 7 was thus obtained.

Example 8

In Example 8, a porous body was obtained in the same manner as in Example 7 except that an LCP powder and an acrylic resin powder were weighed so that the volume ratio was 1:3.

Reference Example 1

As Reference Example 1, a commercially available LCP melt-blown nonwoven fabric having a basis weight of 4 g/m² was prepared.

[Observation of Porous Body]

FIGS. 3 to 8 are photographs (SEM images) of sections of porous bodies in Examples 1 to 3 and 7, Comparative Example 1, and Reference Example 1. From the photographs of FIGS. 3 to 8, it can be seen that a larger number of fibers having a thick fiber diameter is contained and the fibers are fused together in the porous bodies of Examples compared to the porous body of Comparative Example. It can be seen that a large number of fibers having a thin fiber diameter is contained and the fusion between the fibers is insufficient in the porous body of Comparative Example 1. It can be seen that the porous body of Reference Example 1 contains fibers that are significantly thicker than those in Examples and the shape of pores is also simpler than those in Examples. In a case where a porous body is obtained by performing heating at a temperature (over 280° C.) higher than the heating temperature in Examples described above, it has been confirmed that a large number of fibers having a thick fiber diameter is contained and the fibers are fused together up to 310° C., that is, the temperature lower than the melting point of the LCP raw material by 5° C., but it has been confirmed that the fibers are softened and the porous structure cannot be maintained when the temperature exceeds 310° C.

[Measurement of Pore Distribution]

The pore distribution in the porous body according to each of Examples 1 to 8, Comparative Examples 1 and 2, and Reference Example 1 was measured using a mercury intrusion porosimeter (AutoPore V9605 manufactured by Micromeritics Instrument Corporation). The results are presented in the columns of "average pore size (µm)", "cumulative pore volume (mL/g)" and "cumulative pore specific surface area (m²/g)" in Table 1.

[Measurement of ISO Air Permeability]

The ISO air permeability of the porous body according to each of Examples 1 to 8, Comparative Examples 1 and 2, and Reference Example 1 was measured using a Gurley type densometer (Gurley Type Air Permeability Tester manufactured by YASUDA SEIKI SEISAKUSHO, LTD.). Air permeability is the average flow rate of air that permeates per unit area, unit pressure difference, and unit time, and it means that the air permeates more easily as this value is higher. The ISO air permeability was measured in conformity with JIS P8117: 2009 "Paper and paperboard—Air permeability and air resistance test method (intermediate area)—Gurley method". The results are presented in the column of "ISO air permeability (µm/Pa·s)" in Table 1. As mentioned above, the air permeates more easily as the value of ISO air permeability is higher, but the density of the porous body may decrease and the strength may become insufficient when the value increases. Therefore, in the present disclosure, an ISO air permeability of 40 µm/Pa·s or less is determined to be favorable. Regarding Reference Example 1, the ISO air permeability is a value measured by stacking nine sheets of LCP melt-blown nonwoven fabric.

[Measurement of Tensile Strength]

The tensile strength of the porous body according to each of Examples 1 to 8, Comparative Examples 1 and 2, and Reference Example 1 was measured using a dynamic viscoelasticity meter (RSA-G2, manufactured by TA Instruments). Specifically, the tensile strength was determined by dividing the load value when a 5 mm×25 mm test piece taken from the porous body is stretched at a length of test piece between grips of 13 mm and a tensile speed of 0.6 mm/min and cut by the sectional area excluding the pore portion. The results are presented in FIGS. 1 and 2 and in the column of "Tensile strength (N/mm²)" in Table 1. The n number of each test piece was 3, and the value in Table 1 is their average value.

TABLE 1

|  | Heating temperature (° C.) | Average pore size (μm) | Cumulative pore volume (mL/g) | Cumulative pore specific surface area (m²/g) | ISO air permeability (μm/Pa · s) | Tensile strength (N/mm²) |
|---|---|---|---|---|---|---|
| Example 1 | 260 | 2.70 | 2.92 | 4.32 | 39.3 | 30.4 |
| Example 2 | 270 | 2.91 | 2.74 | 3.78 | 41.6 | 57.2 |
| Example 3 | 280 | 3.31 | 1.96 | 2.37 | 38.0 | 75.6 |
| Example 4 | 280 | 2.89 | 3.20 | 4.39 | 41.3 | 31.6 |
| Example 5 | 290 | 3.12 | 2.69 | 3.47 | 37.5 | 46.4 |
| Example 6 | 300 | 3.16 | 2.12 | 2.38 | 34.2 | 68.0 |
| Example 7 | 380 | 0.11 | 0.61 | 21.5 | 11.8 | 75.5 |
| Example 8 | 380 | 0.91 | 1.11 | 16.1 | 18.3 | 68.0 |
| Comparative Example 1 | 250 | 2.55 | 3.17 | 4.99 | 43.5 | 20.4 |
| Comparative Example 2 | 270 | 2.61 | 2.92 | 5.28 | 46.7 | 20.8 |
| Reference Example 1 | — | 21.1 | 4.51 | 0.85 | 1045.6 | — |

Figure 2:
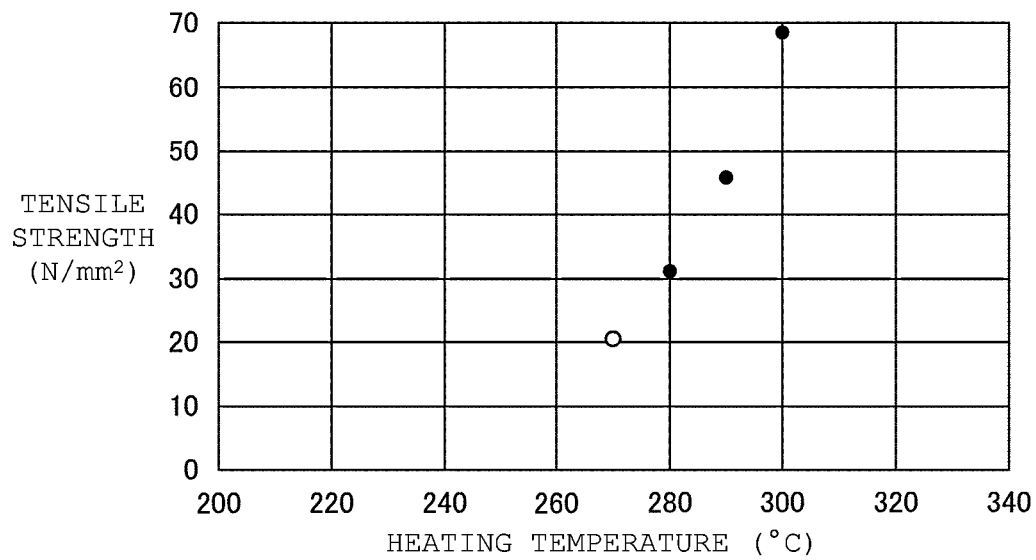
FIG. 2 is a graph illustrating relation between a heating temperature in a heating step and a tensile strength for Examples 4 to 6 and Comparative Example 2.
Figure 3:
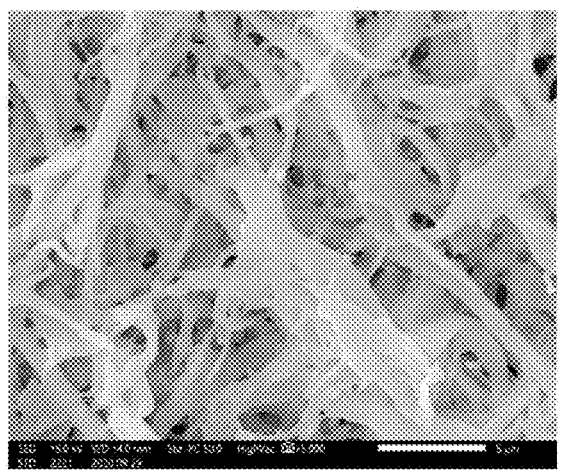
FIG. 3 is a photograph of a section of a porous body in Example 1.
Figure 4:
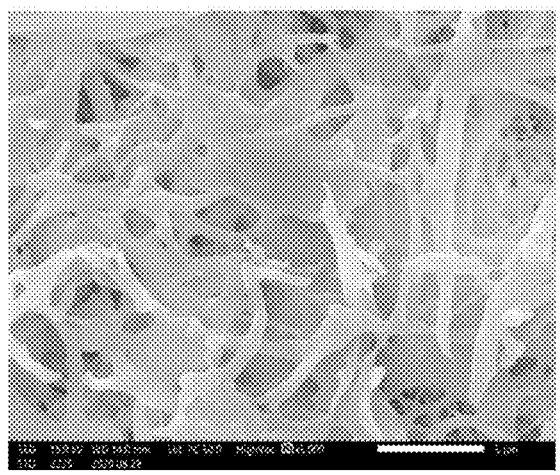
FIG. 4 is a photograph of a section of a porous body in Example 2.
Figure 5:
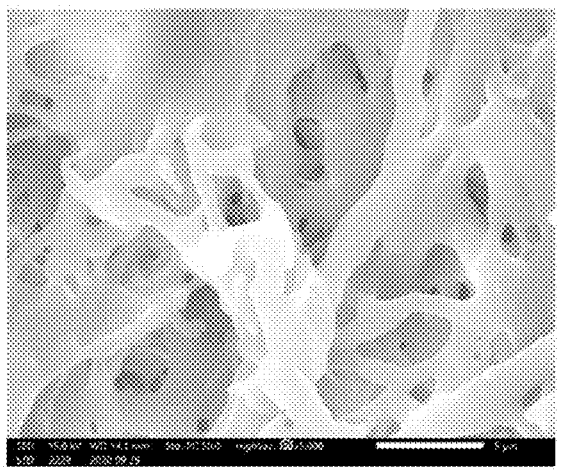
FIG. 5 is a photograph of a section of a porous body in Example 3.
Figure 6:
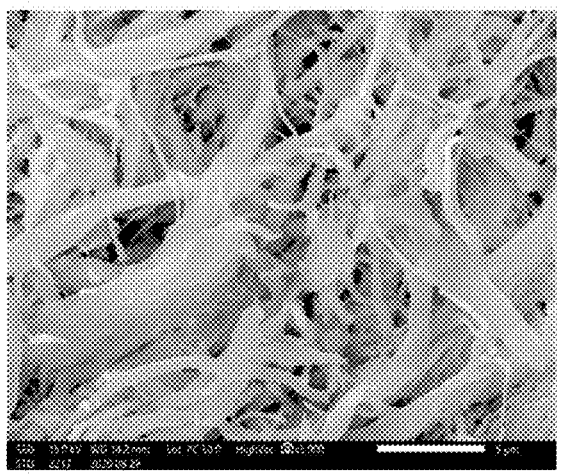
FIG. 6 is a photograph of a section of a porous body in Comparative Example 1.
Figure 7:
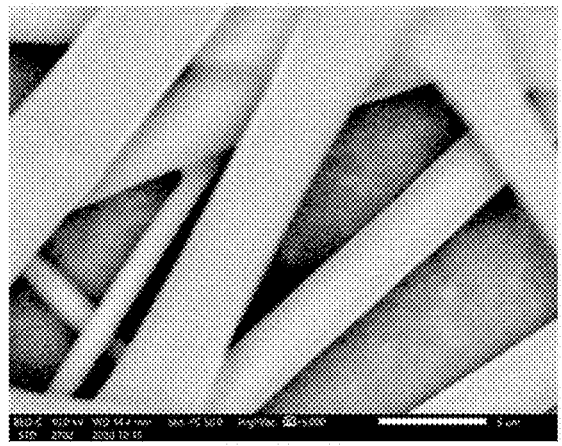
FIG. 7 is a photograph of a section of a porous body in Reference Example 1.
Figure 8:
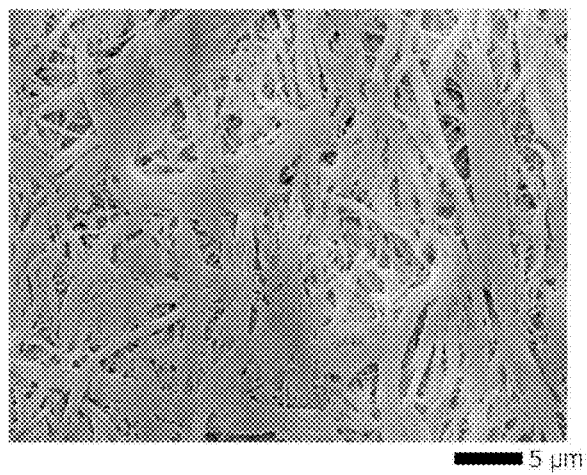
FIG. 8 is a photograph of a section of a porous body in Example 7.

As presented in FIGS. 1 and 2 and Table 1, it can be seen that the porous bodies according to Examples 1 to 8 have higher tensile strength than those of Comparative Examples 1 to 2. As can be seen from the SEM images of FIGS. 3 to 7 as well, it is considered that this is because the tensile strength is improved as thin fibers begin to fuse at a temperature lower than the melting point of LCP powder by about 60° C. (255° C. for Examples 1 to 3 and Comparative Example 1, 280° C. for Examples 4 to 6 and Comparative Example 2) and the amount of fibers fused together increases. In Reference Example 1, the average pore size is larger by nearly 10 times and the properties, such as filtering properties, as a porous body are significantly inferior.

It can be seen that the porous bodies according to Examples 7 and 8 have extremely fine average pore sizes of 1.0 μm or less. Porous bodies having such fine average pore sizes are considered to be excellent in strength and filtering properties.

Although not presented in FIGS. 1 to 2 and Table 1, in a case where a porous body is obtained by performing heating at a temperature higher than the heating temperature in Examples described above, the tensile strength increases up to a temperature lower than the melting point of the LCP raw material by 20° C. to 30° C., but a further increase in tensile strength has not been confirmed when the temperature is raised up to a temperature lower than the melting point of the LCP raw material by 5° C. When the temperature exceeded a temperature lower than the melting point of the LCP raw material by 5° C., waviness and large perforation occurred and the film could not maintain its shape, and the tensile strength could not be measured.

Test 2

Example 9

In Example 9, an LCP fiber mat was formed using the same LCP powder as in Example 1 through an applying step and a drying step.

First, the same LCP powder as in Example 1 was dispersed in butanediol as a dispersion medium to form a paste.

Next, the paste-like LCP powder was applied onto the roughened surface of an electrolytic copper foil (FWJ-WS-12 manufactured by Furukawa Electric Co., Ltd.) having a 200 mm square and a thickness of 12 μm using a 160 mm square metal plate. Then, the electrolytic copper foil coated with the paste-like LCP powder was heated to 180° C. on a hot plate to vaporize butanediol as a dispersion medium and dry the paste-like LCP powder on the electrolytic copper foil. In this way, a thin LCP fiber mat was formed on an electrolytic copper foil.

The paste-like LCP powder was further applied onto this thin LCP fiber mat. The applied paste-like LCP powder was dried in the same manner as when the paste-like LCP powder applied previously was dried. As described above, the application and drying were repeated a plurality of times to form an LCP fiber mat adjusted so that the basis weight was 15 g/m² on an electrolytic copper foil.

The electrolytic copper foil on which an LCP fiber mat was formed was heated at 280° C. for 60 minutes in a nitrogen stream using the same hot air inert oven as in Example 1. In this way, a copper foil composite was obtained in which a porous body having a thickness of about 70 μm was formed on a part of one surface of a copper foil.

Example 10

In Example 10, PTFE (amorphous, average particle size: 4.0 μm, melting point: 331° C.) was prepared as an additive.

PTFE and the same LCP powder as in Example 1 were dispersed in butanediol as a dispersion medium to form a paste. The mixing ratio of PTFE to the LCP powder was 5:5 in terms of volume ratio. A copper foil composite in which a porous body having a thickness of about 50 μm was formed on a part of one surface of a copper foil was obtained by the same manufacturing process as in Example 9 except for the above points.

Example 11

In Example 11, a boron nitride powder (scale-like, average particle size: 0.5 μm) was prepared as an additive.

The boron nitride powder and the same LCP powder as in Example 1 were dispersed in butanediol as a dispersion medium to form a paste. The mixing ratio of the boron nitride powder to the LCP powder was 5:5 in terms of volume ratio. A copper foil composite in which a porous body having a thickness of about 50 μm was formed on a part of one surface of a copper foil was obtained by the same manufacturing process as in Example 9 except for the above points.

[Observation of Copper Foil Composite]

In the copper foil composites of Examples 9 to 11, as described above, it was possible to form a porous body not on the entire surface of the copper foil but on a part thereof. When the copper foil composites of Examples 9 to 11 were rolled into rolls as well, the porous bodies did not peel off from the copper foils and neither warping nor waviness occurred.

[Water repellency Test]

A water repellency test was conducted for Examples 9 and 10. Specifically, pure water or an ethanol aqueous solution at each concentration (50% by mass, 60% by mass, 70% by mass, or 80% by mass) was dropped onto the portion where the porous body was formed of each copper foil composite, and the presence or absence of suction was examined.

In Example 9, it has been confirmed that pure water is not sucked into the porous body when pure water is dropped but the ethanol aqueous solution is sucked into the porous body when a 50% by mass ethanol aqueous solution is dropped. Similarly, suction has been confirmed in 60% by mass, 70% by mass, and 80% by mass ethanol aqueous solutions as well.

Meanwhile, in Example 10, it has been confirmed that pure water is not sucked into the porous body when pure water is dropped and the ethanol aqueous solutions are not sucked into the porous body when 50% by mass, 60% by mass, and 70% by mass ethanol aqueous solutions are dropped, but the ethanol aqueous solution is sucked into the porous body when an 80% by mass ethanol aqueous solution is dropped.

From the results of this test, it can be seen that a high level of water repellency can be imparted by mixing PTFE as an additive with an LCP powder to form a porous body.

[Heat Dissipating Properties Test]

A heat dissipating properties test was conducted for Examples 9 and 11. Specifically, a copper plate was placed on a hot plate heated to 80° C., each of the copper foil composites of Examples 9 and 11 was disposed thereon, and the surface temperature was measured by thermography.

The surface temperature of the copper foil composite of Example 11 was higher than the surface temperature of the copper foil composite of Example 9 by 5° C. From the results of this test, it can be seen that heat dissipating properties can be imparted by mixing a boron nitride powder as an additive with an LCP powder to form a porous body.

In the present Examples, a water repellency test and a heat dissipating properties test were conducted, but it is considered that the functions possessed by additives can be imparted to a porous body in addition to the water repellency and heat dissipating properties.

In the descriptions of embodiments described above, the configurations that can be combined may be combined with each other.

It should be understood that the embodiments and Examples disclosed herein are illustrative in all respects and not restrictive. The scope of the present disclosure is specified by the claims, but not the above description, and intended to encompass all modifications within the spirit and scope equivalent to the claims.

The invention claimed is:

1. A porous body comprising:
a liquid crystal polymer powder that contains liquid crystal polymer fibers, wherein
an average size of the liquid crystal polymer fibers is 2 μm or less,
the porous body has an average pore size of 10 μm or less as measured by mercury intrusion porosimetry, and
the porous body has a tensile strength of 25 N/mm$^2$ or more.

2. The porous body according to claim 1, further comprising an additive.

3. The porous body according to claim 2, wherein the additive is at least one selected from polytetrafluoroethylene and a nitride powder.

4. The porous body according to claim 1, wherein the average pore size is 1.0 um or less.

5. The porous body according to claim 1, wherein the liquid crystal polymer fibers have an average aspect ratio of 10 to 500.

6. The porous body according to claim 1, wherein, in the liquid crystal polymer powder, a content of particles other than the liquid crystal polymer fibers is 20% or less.

7. The porous body according to claim 1, wherein the liquid crystal polymer powder has a D50 average particle size value of 13 μm or less.

* * * * *